United States Patent

[11] 3,616,410

[72] Inventors Leonid Davidovich Shtoffer
Vysheslavtsev Pereulok, 9, kv. 6;
Viktor Fedorovich Bashutkin, Stantsia
Perlovskaya, 3 Yaroslausky pereulok, 4,
both of, Moscow, U.S.S.R.
[21] Appl. No. 761,594
[22] Filed Sept. 23, 1968
[45] Patented Oct. 26, 1971

[54] PARTIAL GAS PRESSURE TRANSDUCER
1 Claim, 3 Drawing Figs.
[52] U.S. Cl. ................................................. 204/195
[51] Int. Cl. ............................................. G01n 27/46
[50] Field of Search ............................. 204/1, 195

[56] References Cited
UNITED STATES PATENTS
3,070,539  12/1962  Arthur et al. ................. 204/195
3,278,408  10/1966  Leonard et al. ............... 204/195
3,334,039   8/1967  Vlasak ........................... 204/195
3,406,109  10/1968  Molloy .......................... 204/195
3,510,421   5/1970  Gealt ............................. 204/195
3,227,643   1/1966  Okun et al. ................... 204/195
3,235,477   2/1966  Keyser et al. ................ 204/195

Primary Examiner—T. Tung
Attorney—Waters, Roditi, Schwartz & Nissen

ABSTRACT: A partial gas pressure transducer comprises a polarographic cell having a body containing electrolyte solution connected to a conduit leading to a header which is at atmospheric pressure and temperature. An indicator electrode is mounted on a perforated rigid partition secured to the body such that the indicator electrode is external of the body. The partition provides communication between the indicator electrode and the electrolyte solution in the body. The partition may be integral with the body. A gas-permeable diaphragm externally covers the indicator electrode and is secured to the body to clamp the indicator electrode between the partition and diaphragm. An auxiliary electrode is mounted within the cell in contact with the electrolyte solution.

PATENTED OCT 26 1971  3,616,410

PARTIAL GAS PRESSURE TRANSDUCER

This invention relates to instruments for polarographic analysis and, more particularly, to partial gas pressure transducers and, still more particularly, to gaseous or dissolved oxygen partial pressure transducers which find application in industry, such as in the production of antibiotics, vaccines, sera, vitamins, enzymes, yeasts and other microbiological synthesis products, as well as for estimating the content of oxygen in blood, in systems for waste water purification, in fish farming, etc.

Known in the art are partial gas pressure transducers, preferably dissolved or gaseous oxygen partial pressure transducers, comprising a polarographic cell which contains an indicator electrode and an auxiliary electrode immersed in an electrolyte solution, provision being made in the cell for a gas-permeable diaphragm disposed close to the indicator electrode and intended for separating the cell from a test medium.

To provide for sterilization of the known transducers, to avoid mechanical damages, such as diaphragm rupture, indicator electrode displacement from the diaphragm and transducer breakage, and to prevent the electrolyte from boiling away, the cavity of the transducers is in communication with the chamber of an apparatus so that the pressure inside and outside the transducer is equalized.

However, sterilizing the known transducers is practicable where sterilization conditions provide for exceedingly slow heating and cooling, the observance of this condition being mandatory in so far as boiling away of the electrolyte in the cell can be prevented only in case the electrolyte temperature closely matches the pressure in the apparatus. When recourse is had to steam sterilization under plant conditions, the aforesaid relationship is unattainable since, for example, the cooling step brings about pressure drop in the apparatus, but the thermal lag of the transducer and associated protective appliances will be responsible for the electrolyte temperature being higher than the temperature of the steam at the given pressure in the apparatus and boiling away of electrolyte will ensue.

It is an object of the present invention to provide a partial gas pressure transducer, preferably a dissolved or gaseous oxygen partial pressure transducer, designed so as to make possible steam sterilization of the transducer under plant conditions and also employment of the transducer when the test medium is subjected to variable pressure.

In accordance with this and other objects, in the partial gas pressure transducer, preferably a dissolved or gaseous oxygen pressure transducer, made in the form of a polarographic cell having an indicator electrode and an auxiliary electrode immersed in an electrolyte solution and furnished with a gas-permeable diaphragm mounted close to the indicator electrode and intended for separating the polarographic cell from the medium under examination, provision is made, according to the invention, for a perforated rigid partition which separates the indicator electrode from the cell cavity, said rigid perforated partition being disposed so that the indicator electrode is clamped between said partition and said gas-permeable diaphragm.

The aforesaid constructive features make the transducer, according to the invention, suitable for use in conjunction with apparatus to be sterilized with steam.

Other objects and advantages of the present invention will become apparent from a consideration of the specific embodiments thereof and accompanying drawing, wherein.

Figure 1:
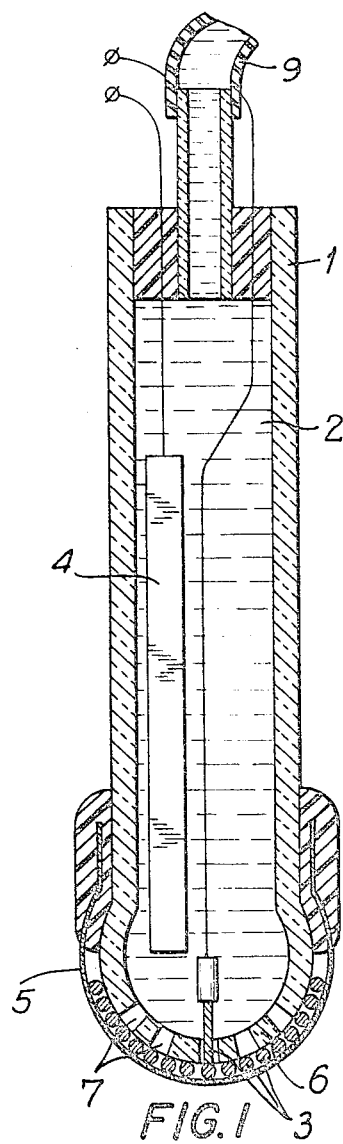
FIG. 1 is a longitudinal sectional view of the transducer, according to the invention.

The present transducer comprises a polarographic cell whose cylindrical body 1 (FIG.1) made from an insulating material capable of withstanding a temperature of up to 150° C., such as molybdenum glass, and charged with electrolyte 2, e.g. an acetate buffer, incorporates indicator electrode 3 consisting of a flat platinum helix and auxiliary electrode 4 consisting of a lead plate. Disposed in close vicinity to electrode 3 is a gas-permeable diaphragm 5, which separates the cell from the test medium, viz, a culture liquid. To separate the cell cavity from the indicator electrode 3, use is made of a rigid partition 6 having perforations 7 and positioned so as to clamp indicator electrode 3 between said partition 6 and said diaphragm 5. In the preferred embodiment of the transducer, according to the invention, the partition 6 is made integral with cell body 1, but it is likewise feasible to make the partition in the form of a perforated insert. Included between electrode 3 and diaphragm 5 is a layer of electrolyte 2 whose thickness remains constant due to the fact that electrode 3 and diaphragm 5 are fixedly disposed in relation to each other.

Figure 2:
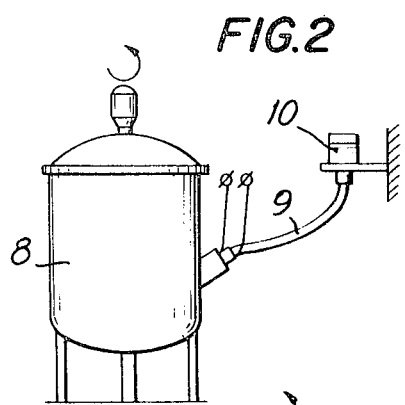
FIG. 2 is a diagrammatic elevational view of a steam-sterilized apparatus connected to the transducer outlet branch.

When the present transducer is to be used in conjunction with steam-sterilized apparatus 8 (FIG. 2), provision is made in body 1 of the polarographic cell for an outlet union 9, which communicates with a header 10 disposed outside apparatus 8 and maintained at room temperature and atmospheric pressure. Both union 9 and header 10 are filled with electrolyte solution 2.

Figure 3:
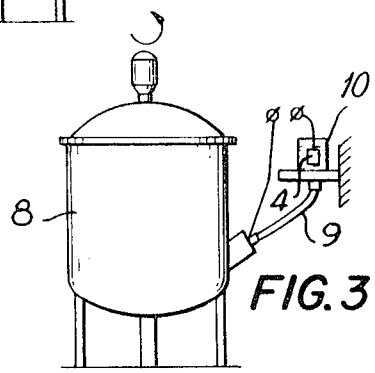
FIG. 3 shows a modification of the apparatus of FIG. 2.

In case auxiliary electrode 4 is to attain high temperatures, it is expedient to dispose said electrode in header 10 as shown in FIG. 3 and to use outlet branch 9 filled with electrolyte solution as a salt bridge between indicator electrode 3 and auxiliary electrode 4.

When used in conjunction with a steam-sterilized apparatus, the present transducer operates in the following manner.

The apparatus may be steam sterilized at a temperature of about 130° C. and for a period of up to 2 hours. During the sterilization process, electrolyte vapors formed in the cell undergoes condensation in outlet union 9, which union is maintained at room temperature, and electrolyte 2 flows to the transducer. Due to this arrangement, the transducer will be filled, upon sterilization termination, with boiled electrolyte 2 containing no dissolved gases, thereby being made ready to operate. The provision of rigid partition 6 between indicator electrode 3 and the cell cavity renders it possible to sustain a significant pressure in apparatus 8 without rupturing diaphragm 5 or deflecting indicator electrode 3 from said diaphragm, another beneficial result being steady performance of the transducer despite variations in pressure, mixing intensity or flow rate of the medium under examination.

The present transducer lends itself to repeated steam sterilizations without impairing its operation.

Although the present invention has been described with reference to preferred embodiments thereof, it will be readily understood by those skilled in the art that various alterations and modifications may be made without deviating from the spirit and scope of the invention as disclosed hereinabove and defined in the appended claims.

We claim:

1. A partial gas pressure transducer employing the polarographic principle of analysis, comprising a body defining an inner cavity; and electrolyte filling said inner cavity; means for condensing the vapors of said electrolyte having one end hermetically connected with said body and communicating with the inner cavity thereof, and having an opposite end directly communicating with the atmosphere; an auxiliary electrode immersed in said electrolyte an indicator electrode constituted as a spiral and located outside said body; a perforated rigid partition which bounds the inner cavity of said body and through which said electrolyte communicates with said indicator electrode; and a gas-permeable diaphragm secured on said body to clamp said indicator electrode tightly between said partition and said diaphragm.

* * * * *